Jan. 12, 1960   C. P. KIPP ET AL   2,920,783
AUTOMATIC RIVETING APPARATUS
Filed Aug. 20, 1953   7 Sheets-Sheet 1

FIG.1

INVENTORS
Calvin P. Kipp
Melvin B. Cole
Herbert M. Cole
BY
ATTORNEYS

Jan. 12, 1960     C. P. KIPP ET AL     2,920,783
AUTOMATIC RIVETING APPARATUS
Filed Aug. 20, 1953     7 Sheets-Sheet 3

FIG. 3

INVENTORS
Calvin P. Kipp
Melvin B. Cole
BY   Herbert M. Cole

ATTORNEYS

United States Patent Office 2,920,783
Patented Jan. 12, 1960

2,920,783

AUTOMATIC RIVETING APPARATUS

Calvin P. Kipp, Caldwell, N.J., Melvin B. Cole, Forest Hills, N.Y., and Herbert M. Cole, Teaneck, N.J., assignors to Federal Pacific Electric Company, Newark, N.J., a corporation of Delaware Application August 20, 1953, Serial No. 375,395

13 Claims. (Cl. 218—.5)

The present invention relates generally to an automatic riveting machine and in particular to apparatus for automatically positioning an article for a riveting operation.

Heretofore, in automatic riveting machines, it was necessary for the operator first to individually mount each article to be riveted on the anvil of the machine, next to operate a foot pedal or other control to operate the riveting tool to effect the riveting operation, and, finally, to remove each riveted article from the anvil and to replace it with the next article to be riveted. This was a necessary procedure since the rivet receiving recess in the article must be in registry with the anvil and riveting tool. However, this was a time consuming operation, especially where a plurality of rivets had to be simultaneously inserted in an article, since it is necessary that the article be correctly disposed relative to, and in registry with, a plurality of separate anvils and an equal plurality of separate riveting tools, there being one anvil and a companion tool required for each rivet that is to be inserted in the article.

Therefore, the primary object of the present invention is the provision of means for eliminating the aforementioned separate operations or steps of the prior art.

Pursuant thereto, another object is to provide for a single operation which automatically and correctly disposes the article in registry with the anvils and companion riveting tools, automatically initiates the riveting operation upon said disposition of the articles, and automatically removes the article from the anvils after they have been riveted.

Another object is the provision of means for preventing the operation of the riveting machine unless the article is in proper disposition at the riveting station thereof.

In accordance with the foregoing object another object is the provision of means for operating the riveting machine under the control of automatic article orienting means operable at the riveting station.

A further object is the provision of means for operating the article orienting means in response to movement of the article into the riveting station.

A further object is the provision of a generally improved and more efficient automatic riveting machine.

The above and other objects, features and advantages of the present invention will be more fully understood from the following description considered in connection with the accompanying illustrative drawings.

The automatic article-positioning or orienting apparatus 20 of the present invention is intended for use with any suitable automatic riveting machine of known construction. For example, and not by way of limitation, the apparatus of the present invention is presently in use on an automatic riveting machine, model No. 93, manufactured by the Chicago Rivet and Machine Co., Bellwood, Illinois, which is illustrated and described at page 39 of a catalogue entitled "Chicago Rivet Automatic Setting" published by said company. However it will be understood that the present invention is not limited to use with this specific type of automatic riveting machine. Said machine has provision to automatically feed, insert and clinch three rivets at a time which are fed from two hoppers, one of which has a divided raceway and feeds two rivets simultaneously. The machine is equipped with a non-repeating type foot pedal control which is usually operated by an operator, but which, pursuant to the present invention, is operated automatically by a part of the orienting apparatus 20 hereof, as will be hereinafter described in detail. Since the riveting machine, per se, does not constitute the present invention, and since it is of well known construction and in commercial use, detailed description or illustration thereof is deemed to be unnecessary herein. However, portions thereof will be referred to herein, where necessary.

Figure 1:
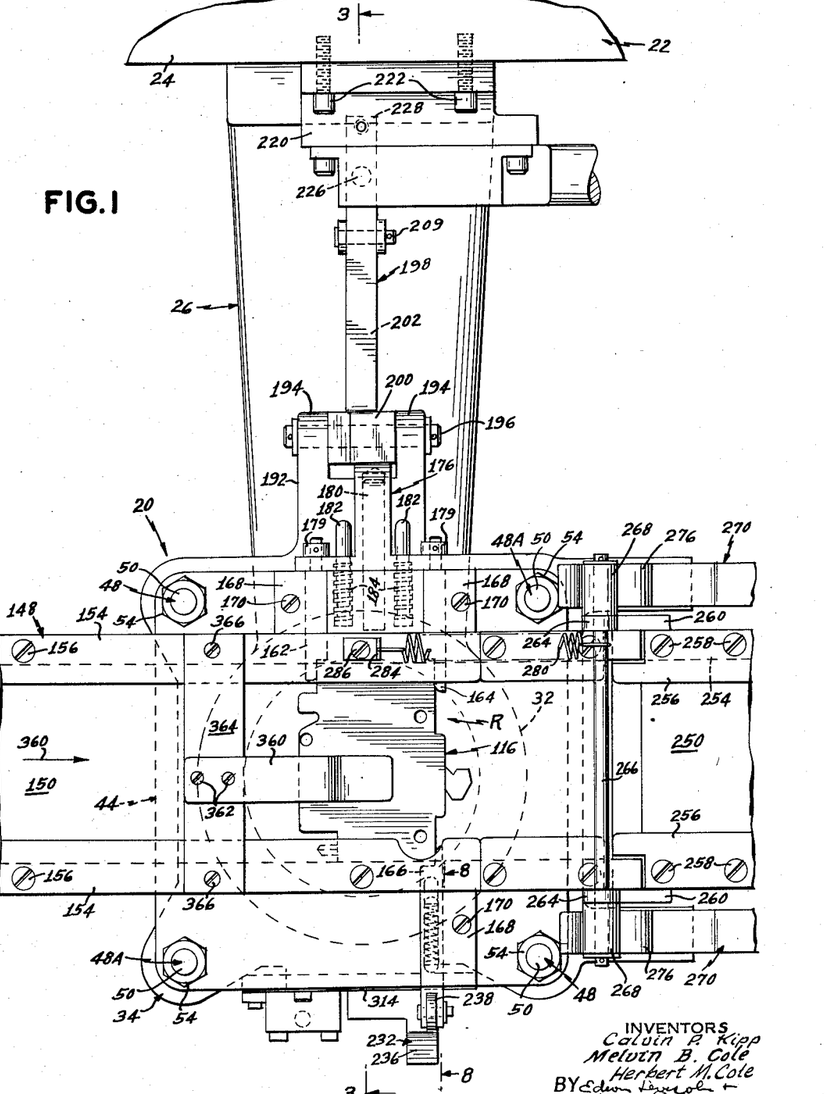
Fig. 1 is a top plan view of an automatic orienting apparatus pursuant to the present invention, as provided in an automatic riveting machine, with an article in position at the riveting station and said apparatus being in operative condition.
Figure 2:
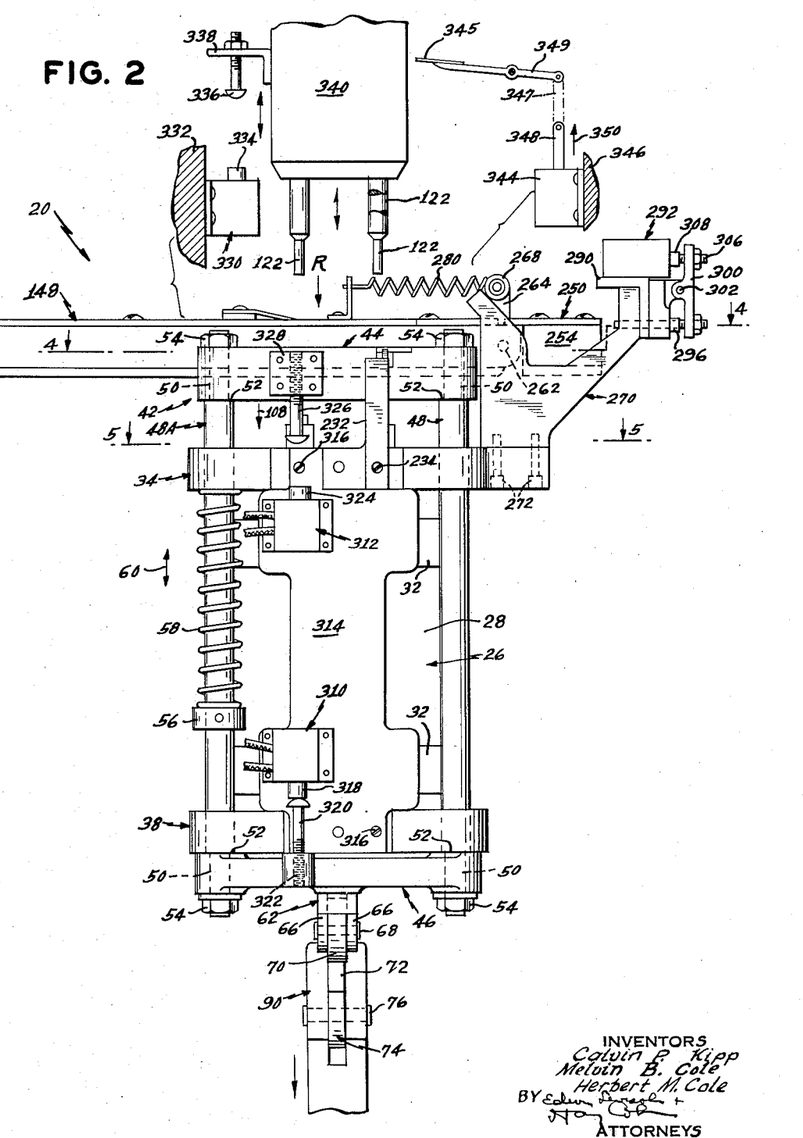
Fig. 2 is a front elevation of the apparatus including fragmentary parts of the automatic riveting machine, the article support being in projected or inoperative disposition thereof.
Figure 3:
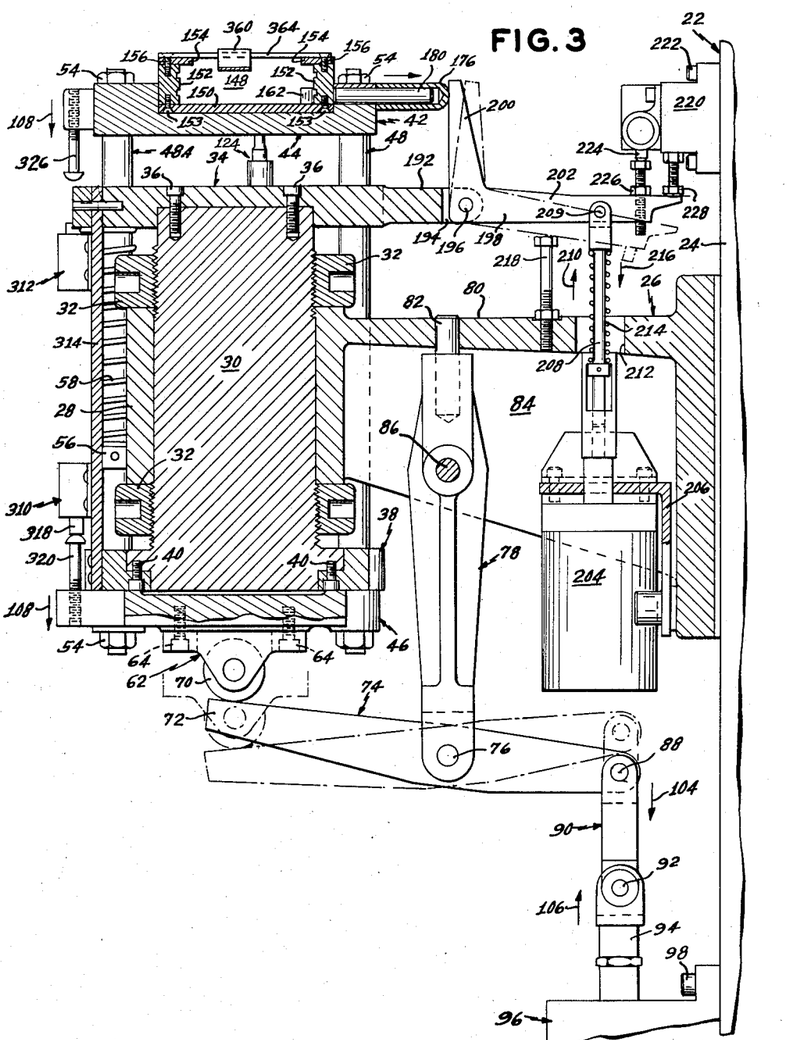
Fig. 3 is a sectional view taken on the line 3—3 of Fig. 1, with the articles omitted.
Figure 4:
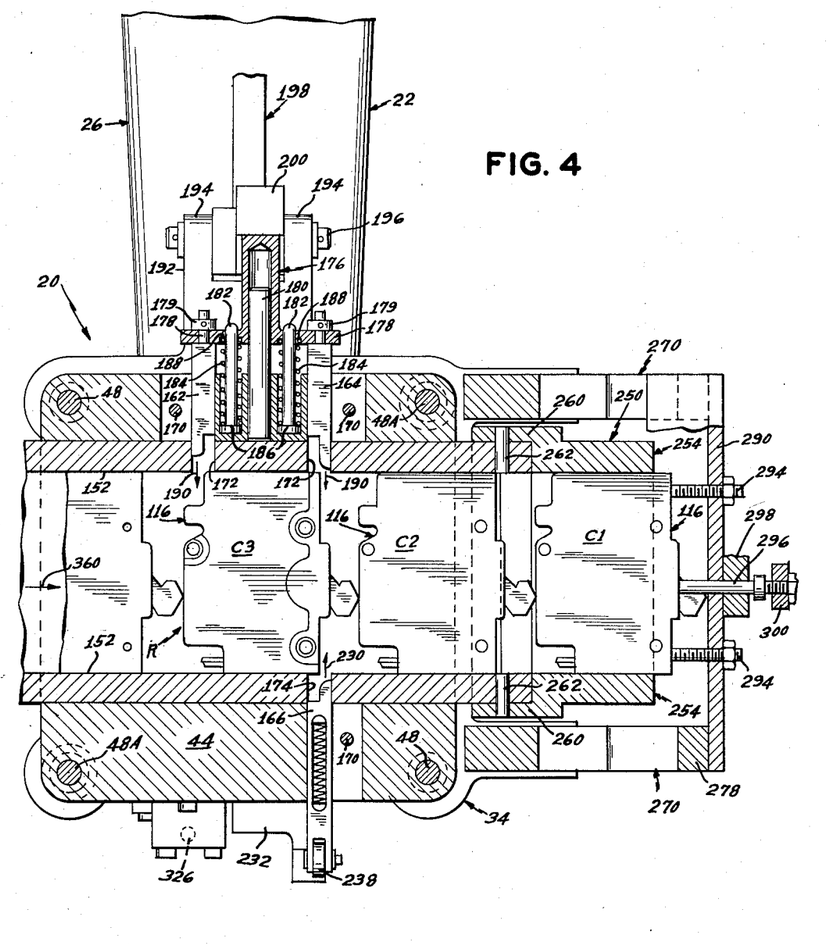
Fig. 4 is a sectional view taken on the line 4—4 of Fig. 2, and illustrates the disposition of the articles in the guideway therefor.

Referring now to the drawings in detail, an automatic riveting machine of known construction, is generally indicated by the reference numeral 22 in Figs. 1, 3 and 4, a portion of the vertical column of the machine being indicated at 24, and the horn of the machine, which extends transversely of and laterally of the column, being indicated at 26. The horn is suitable mounted on the column. At its end remote from the column 24, the horn is provided with a cylindrical portion 28, as best illustrated in Figs. 2 and 3, which mounts an anvil holder body 30 fixedly secured in position on the horn, by the circular nuts 32 threadedly engaged therewith at each end of said portion. It will be noted from Fig. 3 that the anvil holder body 30 projects at each of its ends from the cylindrical portion 28 of the horn and, at its upper end, the anvil holder body mounts a plate or support member 34 which is secured thereto, as by the bolts 36. At its lower end, the anvil holder body mounts a plate 38 which is secured thereto as by the bolts 40. Said plates constitute vertically spaced guides for a vertically reciprocable carriage or carriage assembly generally indicated by the reference numeral 42.

The carriage 42 is constituted by the table plate or bracket member 44, being an upper carriage member at the upper end of the carriage, and by a lift yoke or lower carriage member 46 at the bottom of the carriage, which members are interconnected for unitary movement by four rods 48, 48A. As best illustrated in Fig. 2, each rod is provided, at each end thereof, with a portion 50 of reduced diameter which extends through the adjacent plate member 44, 46 of the carriage, said reduced portions each defining a shoulder 52 against which the adjacent plate abuts and against which it is secured, as by the nut 54. It will be understood that the rods 48 have a sliding fit in the stationary vertically spaced plates 34 and 38 which, as previously indicated, constitute guides therefor. It will be noted from Figs. 1, 4 and 5, that the slide rods 48 are disposed substantially in the form of a square, the diagonally related rods 48A—48A being each provided with a collar 56 (Figs. 2 and 3) which constitutes a seat for one end of a compression spring 58 mounted on the rod, the other end of which spring abuts against the stationary plate 34.

The carriage 42 is mounted for vertical reciprocation relative to the anvil holder body 30, as indicated by the arrowheads 60 in Fig. 2. For this purpose, the lift yoke or lower carriage member 46 is provided with a bracket 62 which is secured to the bottom thereof, as by the bolts 64. The bracket 62 is provided with the laterally spaced arms 66—66 which mount a pin 68 which, in turn, mounts a roller 70 in position between said arms. One end 72 of a rocker arm 74 (Fig. 3) abuts the roller 70. The rocker arm 74 is mounted for pivotal movement on a pivot pin 76 carried at one end of a bracket member 78, the other end of which is secured in the transverse portion 80 of the horn 26, as at 82, the bracket being also secured between spaced webs 84 (of which only one is shown) of the horn, as at 86. At the other end thereof, the rocker arm 74 is pivotally connected, as at 88, to one end of a link 90, the other end of which is connected, as at 92, to the plunger or shaft 94 of an air cylinder or air motor 96, secured to the column 22, as by bolts 98 (of which only one is shown). The air motor 96 may be of any suitable type, and, in the apparatus as now constructed, the air motor is constituted by model BEM-2 manufactured by the Bellows Company, Akron, Ohio, which is illustrated on page 7 of a catalogue entitled "Bellows Model BEM," published by said company. It will be understood that the air motor 96 is provided with an electrically operated air valve of suitable construction, and in the present instance, the air motor is provided with an electrically actuated valve, manufactured by said company and described in said catalogue. Said valve includes transformers, indicated herein at 100 and 102 (Fig. 10), for operating the valve. Said transformers are provided, in the primary circuits thereof, with suitable switches, as hereinafter described in detail, and energize solenoids for operating the air valve to advance or to retract, as the case may be, the plunger 94 of the air motor 96. In this connection, it will be understood that when the transformer 100 is energized, the solenoid 101 operates the valve to evacuate the air from the cylinder 96 so as to permit the carriage 42 to drop by gravity, which movement is assisted by the pressure exerted by the springs 58, from the upper position of the carriage illustrated in Fig. 2 and in full line in Fig. 3, to the lower position thereof, as illustrated in the broken line position of the roller 70 in Fig. 3. Thereafter to raise the carriage to its full line position, the transformer 102 is energized, as hereinafter described in detail, to energize the solenoid 103 to admit air to the cylinder to move the plunger 94 in the direction of the arrow 104 in Fig. 3 so as to withdraw the plunger 94 into the cylinder for pivoting the rocker 74 from the broken line position thereof illustrated in Fig. 3, to the full line position thereof to raise the carriage to its uppermost position. It will be understood that when the carriage is raised to said uppermost position, the springs 58 are partially contracted so that when the plunger 94 is moved in the opposite direction, namely in the direction of the arrow 106, the carriage 42 moves in the direction of the arrow 108 to the downward position thereof, chiefly by the force of gravity, and assisted by the expansion of the springs 58. The complete circuit for the secondaries of each of the transformers and their connections to their respective solenoids, as well as to the air valve, is fully illustrated and described on page 4 of said catalog published by the Bellows Company, and, since the air valve and the air motor, per se, do not constitute the present invention and as they are of well known construction and in commercial use, further description and illustration thereof is deemed to be unnecessary herein.

Figure 5:
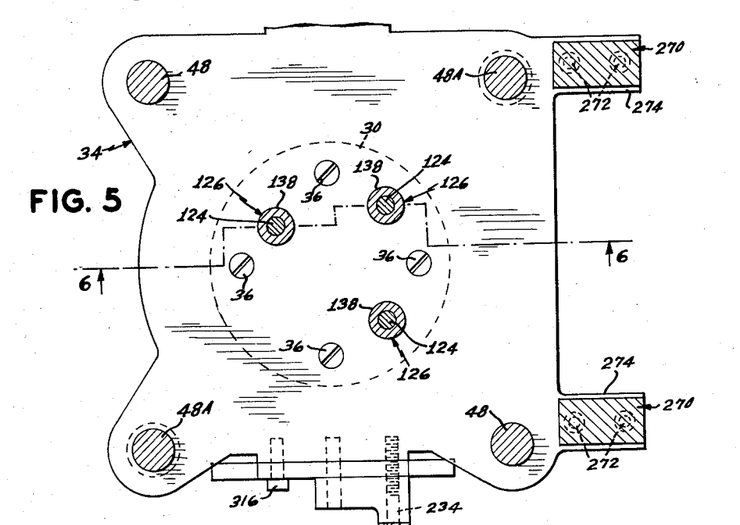
Fig. 5 is a sectional view taken on the line 5—5 of Fig. 2.
Figure 6:
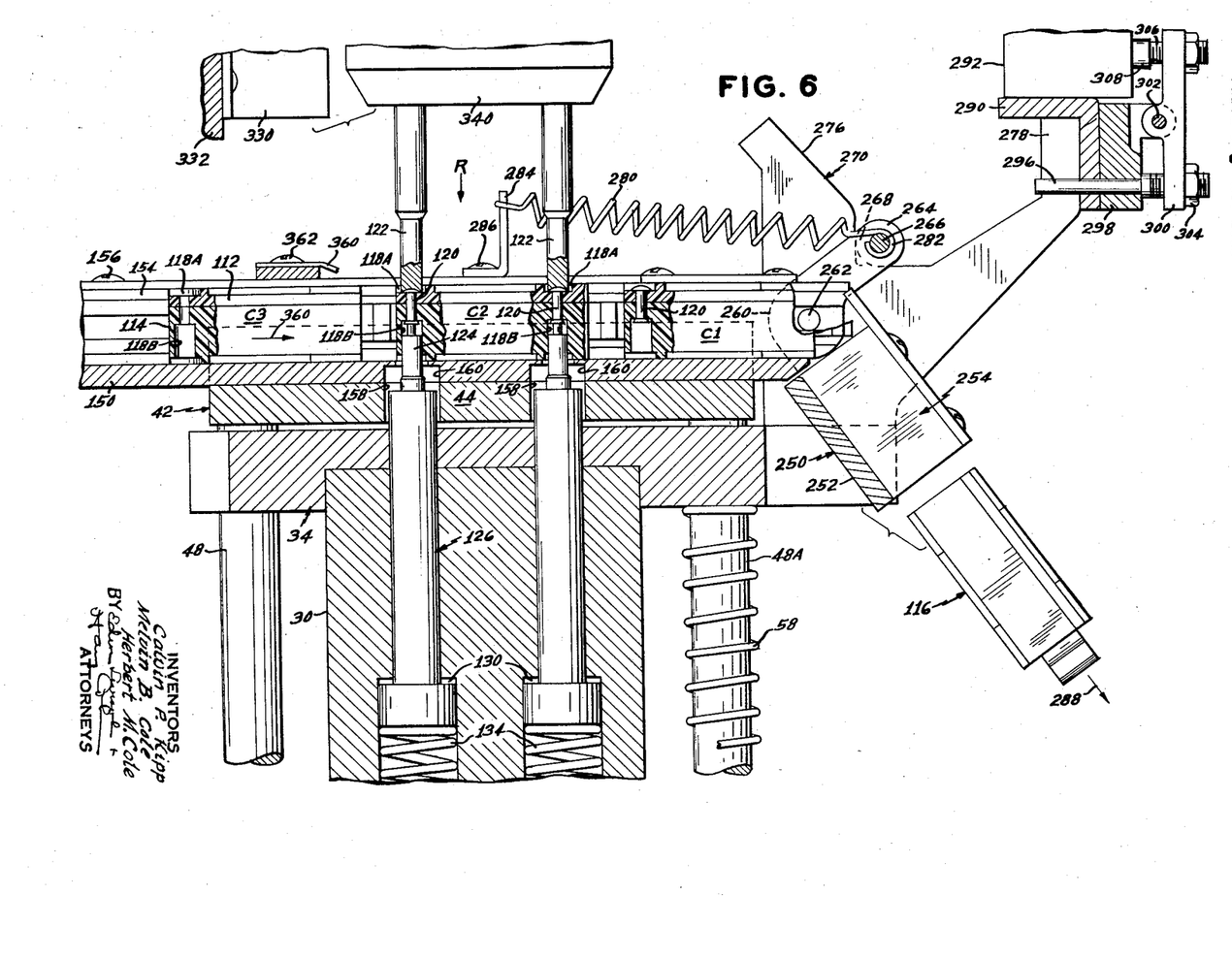
Fig. 6 is a sectional view taken on the line 6—6 of Fig. 5, the article support of the automatic positioning apparatus being illustrated in its lowermost or operating position thereof.
Figures 7, 8:
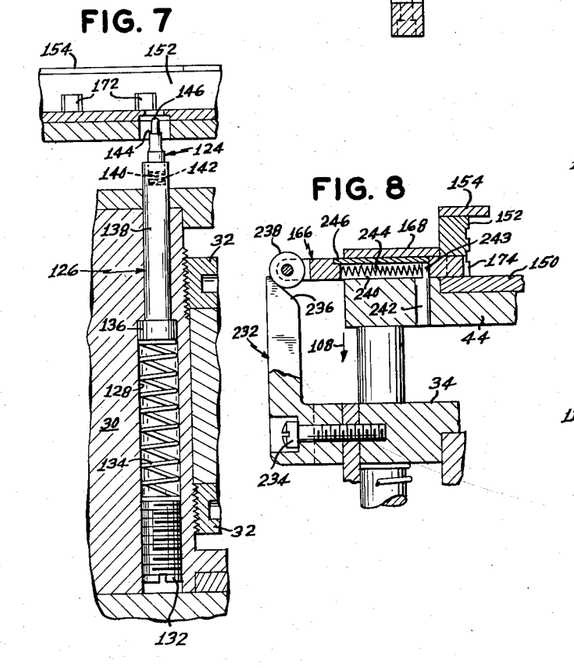
Fig. 7 is an enlarged fragmentary section of a portion of Fig. 6 with the article support illustrated in its upper or inoperative position, and the articles being omitted.
Fig. 8 is a sectional view taken on the line 8—8 of Fig. 1.
Figure 9:
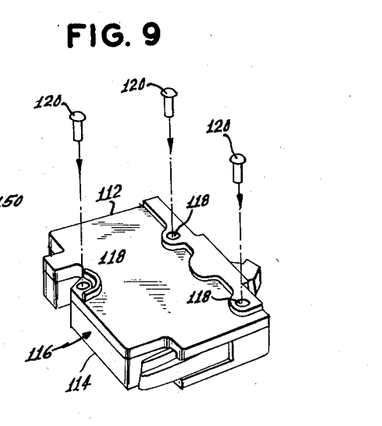
Fig. 9 is an exploded view of an automatic circuit breaker casing and the rivets therefor.

As presently constructed, the orienting apparatus 20 of the present invention is used in connection with automatic circuit breakers 116 having companion insulated casing parts 112 and 114 (Fig. 9) which are to be riveted together to secure said parts in housing defining relation. The casing parts are each provided with the three spaced rivet-receiving apertures or portions 118 for receiving rivets 120. As best illustrated in Fig. 6, the aperture 118A in the cover casing part 112 is in registry with the aperture 118B in the body casing part 114. The aperture 118A is shaped to receive the shank and head of the rivet 120, as well as to permit for the insertion therein of a riveting hammer or tool 122. The aperture 118B is shaped to receive therein an anvil member 124. Said anvil member 124 is part of an anvil assembly 126, which is mounted in the anvil body holder 30. More specifically, and as best illustrated in Fig. 7, the holder 30 is provided, for each anvil assembly 126, with a passageway 128 which extends therethrough, the passageway being open at each end thereof, and being of narrower diameter at the upper end of the holder, so as to form a shoulder 130 therein, as best illustrated in Fig. 6. The lower end of the passageway is closed by a screw member or plug 132 which is threaded therein, and which mounts one end of a spring 134 disposed in the passageway. The other end of the spring abuts the lower end 136 of the anvil assembly, which end is of enlarged diameter. At the other end thereof, the anvil 138 mounts the anvil member 124. Said member is mounted for limited movement within a recess 140 defined in the upper end of the anvil 138, a spring 142 being disposed in the recess 140 underneath the anvil member 124 to bias the latter to the position thereof illustrated in Fig. 7 and to limit the movement thereof into the recess. It will be understood that the member 124 serves as a locating means for disposition in the aperture 118B in the casing part 114 of the circuit breaker mechanism and for this purpose is provided with a projecting portion 146 which extends into said aperture to receive the rivet, as hereinafter described in detail. Said anvil member 124 is also provided with a rivet upsetting shoulder 144. As best illustrated in Fig. 5, there are three anvil assemblies 126 provided herein, one for each of the rivets to be inserted in the circuit breaker casing.

In order to provide for the feed or advancement of the circuit breakers 116 to a riveting position therefor, the upper carriage member or table 44 is provided with a guideway 148 which extends transversely of the horn 26. Said guideway is constituted by a guide base 150 which is suitably secured to the carriage member 44, the guide members 152—152 which are suitably secured to the guide base 150, as at 153, for enclosing the sides of the guideway, and the guide plates 154—154 which are secured to said side members 152—152, as at 156, and which overlie the base 150 of the guideway. As best illustrated in Fig. 6, the carriage member 44 is provided with the apertures 158, and the base 150 of the guideway 148 is provided with the apertures 160 which register therewith, so that the anvil assembly may extend into the guideway for the riveting operation, as hereinafter described in detail. At the riveting station, which is generally indicated by R, provision is made, as here shown, for three article positioning or orienting fingers 162, 164 and 166. It will be noted from Figs. 1 and 4, that the fingers 162 and 164 are disposed at one side of the guideway, and that the finger 166 is disposed, in opposition to finger 164, at the other side thereof. Said fingers are mounted in the carriage plate member 44 for reciprocation transversely of the guideway 148, and are retained therein by the retaining elements 168, which overlie the fingers and which are secured to the carriage plate 44 as by the screws 170. The guide plate 152 at one side of the guideway is apertured as at 172—172, as best illustrated in Figs. 4 and 7, to permit the entry of the fingers 162 and 164 into the guideway, and the opposing side guide member 152 is apertured, as at 174, for permitting the entry of the finger 166 into the guideway. In order to effect the reciprocation of the companion fingers 162 and 164, said fingers are mounted in a yoke 176, as at 178—178 and secured therein as by the elements 179—179. The yoke 176 is mounted for slideable movement on a guide pin 180 which is carried by the carriage member 44. The carriage member, in addition, carries the spaced spring guide pins 182—182, each of which mounts a spring 184, one end of which abuts the companion pin 182, as at an enlarged seat 186, and the other end of which is mounted in a recessed portion 188 of the yoke 176. Consequently, it will be apparent that the springs 184 bias the yoke 176, and consequently the companion fingers 162 and 164, to the retracted position thereof illustrated in Fig. 4, from the projected position thereof illustrated in Fig. 1.

In order to effect the movement of the fingers 162 and 164 into the guideway, as indicated by the arrows 190 in Fig. 4, the previously mentioned stationary plate 34, at the upper end of the anvil holder body 30, is provided with a lateral extension 192, as best illustrated in Figs. 1, 3 and 4, which extension is provided with the spaced portions 194—194 for mounting the pivot 196 for a bell crank lever 198. Said bell crank lever is provided with a lever arm 200, the free end of which is adapted to abut the yoke 176, and with a lever arm 202. To pivot the bell crank lever 198 to the full line position thereof illustrated in Fig. 3, provision is made for a solenoid 204 which is carried by the horn 26, as by a bracket 206. When energized, the solenoid is effective to move the link 208, which is operatively connected thereto, upwardly in the direction of the arrow 210. It will be noted that the transversely extending portion 80 of the horn 26 is apertured, as at 212, to permit for the passage therethrough of the link 208, and that said link is provided with a spring 214 which biases the latter in the direction of the arrow 216 for operating the bell crank lever 202 to the broken line position thereof. It will be noted that said link is pivotally connected, as at 209, to the bell crank lever 198. Consequently, it will be understood that when the solenoid 204 is energized, the link 208 moves upwardly to the full line position thereof, so as to move the yoke 176 and the fingers carried thereby, in the direction of the arrows 190 in Fig. 4, to move said fingers into the guideway, as illustrated in Fig. 1. Upon de-energization of the solenoid 204, the fingers and the yoke are returned to the retracted position thereof, illustrated in Fig. 2, by the expansion of the springs 184, which had contracted upon movement of the fingers to the projected position, and the link 208 is returned to the retracted position thereof by the spring 214, to return the bell crank lever 198 to the broken line position thereof illustrated in Fig. 3, a stop 218 carried by the horn portion 80 limiting the return movement of the bell crank lever.

In addition to operating the fingers to the projected position thereof, the bell crank lever 198 also operates to close a normally open micro switch 220, which is suitably carried by the column 22 of the automatic riveting machine, as by the securing elements 222. Said micro switch is provided with the operating element 224 therefor, which is adapted to be engaged by a switch operating part 226, carried at the free end of the lever arm 202 of the bell crank lever, in the full line position of the lever, as illustrated in Fig. 3. The switch is provided with a detent 228 which limits the movement of the bell crank lever in said full line position thereof. However, as hereinafter described in detail, unless the bell crank lever moves completely to the full line position thereof illustrated in Fig. 3, the switch 220 will not be operated to the closed position.

In order to operate the third finger 166 in the direction of the arrow 230 in Fig. 4 from the retracted position thereof ilustrated in said figure, to the projected position thereof illustrated in Fig. 1, wherein it projects into the guideway, provision is made for the cam member 232 which is secured to the upper stationary guide plate 34, as by the bolt 234 (Figs. 2 and 8). The cam member 232 is provided at the upper end thereof with an inclined camming surface 236 which is engaged by a roller 238 carried at the outer end of the finger 166. The finger 166 is provided with an enclosed slot 240 which extends longitudinally thereof. A detent element 242 carried by the upper carriage plate 44 has a reduced end portion 243 which extends into the finger slot 240, and a spring 244 is disposed between one end of the finger slot and the detent portion 243, being retained in position by a retainer plate 246 mounted in the finger. Consequently, it will be apparent that upon downward movement of the carriage as indicated by the arrows 108 in Figs. 2, 3 and 8, the roller 238 will ride downwardly along the inclined camming surface 236 to move the finger 166 into the guideway, as illustrated in Fig. 1 against the bias of the spring 240. Upon upward movement of the carriage, the spring 244 will serve to return the finger to the retracted position thereof illustrated in Fig. 8.

The fingers 162, 164 and 166 constitute means operable at the riveting station R to correctly orient the article for the riveting station. More specifically, it is the function of said fingers to assure registry of the rivet receiving aperture or portions 118 in the casing 116 with the guide way openings 160, and the openings 158 in the carriage plate 44 so that said rivet receiving openings will be in registry with the anvil elements 124 and with the riveting tools 122, as illustrated in Fig. 6. In this connection, it will be understood that if the article 116 arrives at the riveting station in a position thereof which is rotated in its own plane from that illustrated in Fig. 4, the fingers, acting on three different corners thereof, as in Fig. 1, will rotate or orient the article to effect the required registry of the rivet receiving portions thereof. However, if the article arrives at the riveting station so as to be disposed in a position where the fingers can not properly act thereupon, the article, in said latter position, prevents the movement of the fingers 162 and 164 to the full projected position thereof, and the riveting machine will not operate, as hereinafter described in detail. Therefore, it will be understood that the riveting machine operates under the control of the fingers to prevent damage to an article which is not correctly oriented for the riveting operation.

At the end thereof, the guideway 148 is provided with a pivoted continuation thereof which constitutes an article ejecting chute 250, best illustrated in Fig. 6. The ejecting chute is provided with a base 252 which carries the spaced side members 254—254, and with the overlying guide plates 256—256, which are carried by the side members 254 by means of the securing elements 258. The side members 254 constitute fulcrum elements for the ejecting chute 250, and are provided with the laterally offset portions 260, each of which is pivotally mounted on the adjacent side member 152 of the guideway 148 by a pivot 262, as best illustrated in Fig. 4. The laterally offset pivot portions 260 are each provided with an upwardly extending portion 264, and said latter portions mount a shaft 266 which extends transversely of the chute 250, as best illustrated in Fig. 1. The shaft 266 is provided at each end thereof with a roller 268, disposed outwardly of the adjacent portion 264 of the fulcrum element for the chute 250. Said rollers are adapted to cooperate with the laterally spaced cam brackets 270 which are suitably secured to the stationary plate 34 as by the securing elements 272—272, it being noted from Fig. 5 that the member 34 is provided with the laterally extending portions 274—274 to accommodate the cam brackets. Each bracket 270 is provided with a downwardly inclined camming surface 276 and with a forwardly and upwardly projecting arm 278. The rollers are retained in engagement on the cam surface 276 by a spring 280, one end of which is secured to the shaft 276, as at 282, and the other end of which is carried by a clip 284 which is secured to a portion of the guideway 148, as at 286. Consequently, it will be apparent that when the carriage 42 moves downwardly from the upper position thereof illustrated in Fig. 2, to the lower position thereof illustrated in Fig. 6, the rollers 268 will ride downwardly along the inclined cam surfaces 276 to effect the pivotal movement or tilting of the chute 250, as illustrated in Fig. 6, for effecting removal of a circuit breaker 116 in the direction of the arrow 288 to a suitable conveyor (not illustrated).

The previously mentioned bracket arms 278 mount a cross member 290 which carries a normally open micro switch 292. The cross member 290 carries the laterally spaced detent elements 294—294, which project toward the open end of the chute 250, in the normal or non-ejecting condition of the chute, as best illustrated in Fig. 4. In addition, the cross member 290 mounts a plunger 296 for reciprocation of the latter. The plunger 296 is carried for said reciprocation by a mounting element 298, which is suitably secured to the cross member 290, and which pivotally mounts a lever 300, as by the pivot 302. The plunger is mounted in one end of the lever 300 and secured therein, as by means of the securing element 304, and the other end of the lever mounts pin 306 which is adapted to engage the operating element 308 of the switch 292 to close the latter. It will be noted from Fig. 2 that the plunger 296 extends into the path of movement of the circuit breakers 116 from the riveting station R to the ejection chute 250 and it will be understood that when a circuit breaker is moved into the riveting station, a riveted circuit breaker is moved into the ejection chute so that it abuts the stop pins 294 as illustrated in Fig. 4, and the plunger 296 will be operated by the latter to pivot the lever 300 to close the switch 292, as hereinafter described in detail. Therefore, it will be apparent that the switch 292 operates in response to the positioning of an article to be riveted at the riveting station.

In addition to the switches 220 and 292, provision is also made for the vertically spaced micro switches 310 and 312 each biased to normally open condition and which, as illustrated in Fig. 2, are carried by a mounting plate 314 which is suitably secured to the stationary plate 34 as at 316. The lower switch 310 is provided with an operating element 318, which is adapted to be engaged by a pin 320 which is carried by the lower carriage member 46, as illustrated at 322 in Fig. 2. The pin 320 engages the operating element 318 of the switch 310 in the upper position of the carriage. The upper micro switch 312 is provided with an operating element 324 which is adapted to be engaged by an operating pin 326 carried by the upper carriage member 44 by means of the retaining element 328 upon downward movement of the carriage. In addition to the foregoing switches, provision is also made for a switch 330 which is suitably secured to a convenient portion of the automatic riveting machine, as at 332 (Fig. 2). The switch 330 is provided with an operating element 334 which is biased to close one set of contacts 330A—330B thereof (Fig. 10) and which is adapted to be engaged by an operating pin 336, suitably carried, as by means of a bracket 338 on the riveting head 340, at the bottom or end of the downward riveting stroke of said head. It will be understood that the riveting head 340 is a part of the previously described automatic riveting machine and, as it is well known in the art, further description or illustration thereof is deemed to be unnecessary. The riveting head 340, as here shown, is provided with three riveting hammers 122, one for each of the rivets to be inserted in the circuit breaker casing.

As previously indicated, the automatic riveting machine is provided with the usual foot pedal control which had heretofore been operated by the operator when he had manually disposed the article in position for the riveting operation. In accordance with the present invention, said foot pedal, diagrammatically illustrated at 345 in Fig. 2, is automatically operated through a suitable linkage, by means of a solenoid 344 which is carried at a suitable portion of the riveting machine, as at 346. Said linkage may be of any suitable known construction and is represented, more or less diagrammatically at 347 in Fig. 2, and includes a link 348 which when operated by the solenoid 344 in the direction of arrow 350, operates the linkage 347 to pivot a lever 349 to operate the pedal 345. As previously indicated, the foot pedal 345 constitutes a well known non-repeating type control so that each time it operates, there is a single downward movement of the riveting head 340 and this operation cannot be repeated until the de-energization of the solenoid 344 permits the pedal control to return to its starting position.

Figure 10:
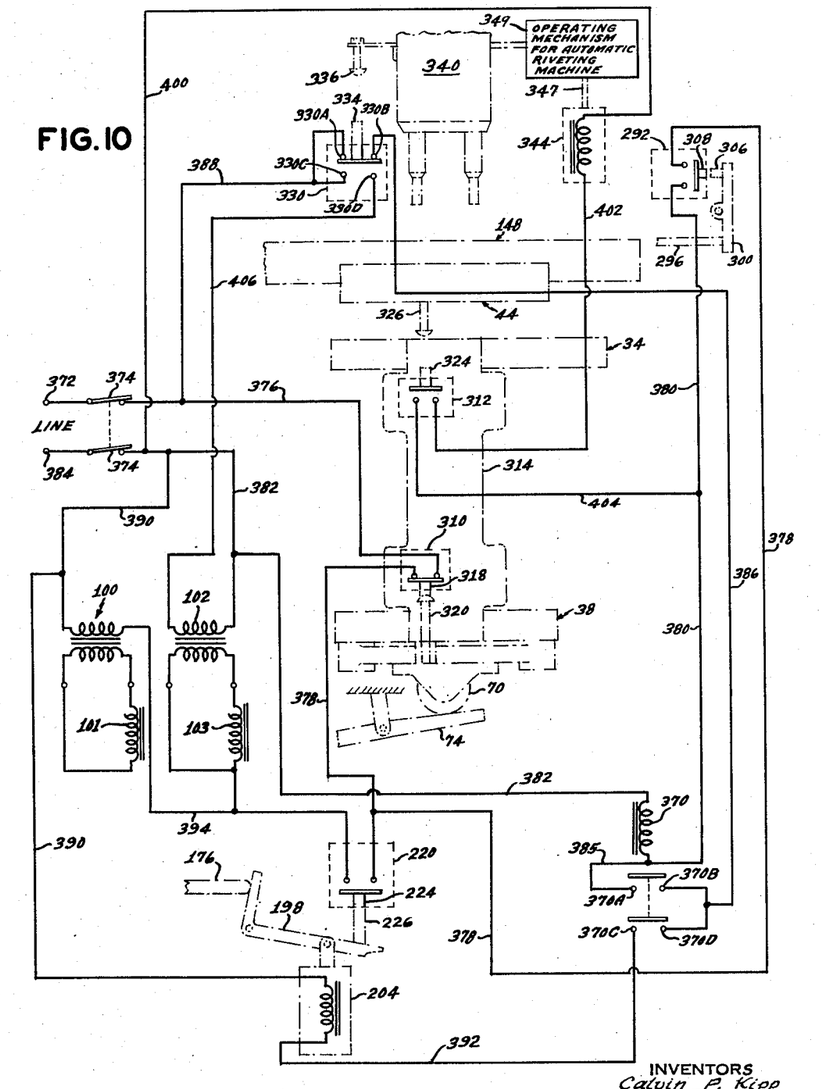
Fig. 10 its a circuit diagram with various parts of the apparatus being illustrated more or less diagrammatically.

In operating the mechanism of the present invention, the circuit breaker casings are inserted manually into the guideway 148 so that they will be disposed in the manner illustrated in Fig. 4. It will be noted therefore that the circuit breakers extend in a row longitudinally of the guideway, the last circuit breaker in the row, i.e., the one being inserted in the guideway, being manually urged in the direction of the arrow 360 in Figs. 1, 4 and 6 at the end of each operating cycle of the automatic riveting machine to initiate a new cycle. It will be noted that this is the sole function of the operator of the machine, namely to insert the circuit breakers in a row in the guideway, and then to manually urge each circuit breaker forward, as inserted therein, for moving the entire row of circuit breakers in the direction of said arrow 360, between the operating cycles of the automatic circuit breaker machine. Assuming now that a cycle of operation has completed so that the circuit breaker in position at the riveting station R in Fig. 6 has been riveted, it will be noted that there is another riveted circuit breaker in position forwardly of the riveting station, in the direction of movement of the circuit breakers. For purposes of discussion, said latter circuit breaker is identified as C1, the circuit breaker at the riveting station being identified as C2. As previously indicated, the removal chute 250 having operated on the downward movement of the table during which circuit breaker C2 was riveted, has removed therefrom the circuit breaker which had been disposed thereupon. Thereafter, it will be apparent that when the table or carriage 42 returns to its uppermost position, the circuit breaker C1 will be at the outlet end of the guideway 148 and the removal chute 250 will be devoid of a circuit breaker and again aligned with the guideway. The operator now inserts a breaker at the lagging end of the row to move the row of circuit breakers so that the circuit breaker C1 moves into position on the removal chute 250, which has returned to the normal position thereof illustrated in Fig. 2, the circuit breaker C2 moving into the position of the circuit breaker C1, and the circuit breaker C3 in Fig. 6 now moving into the riveting position. It will be noted that in said riveting position, the circuit breaker C3 will be resiliently retained by the leaf spring 360 (Figs. 1, 3 and 6) which is secured, as at 362, to a cross bar 364 extending between the guide plates 154—154. As previously indicated, and as illustrated in Fig. 3, when the carriage 42 is in its uppermost position, the operating element 318 of the normally open-switch 310 is engaged by the operating pin 320 carried by the carriage, to close the switch, as illustrated in Fig. 10.

Referring now to Fig. 4, it will be apparent that when the circuit breaker C3 has been advanced into position at the riveting station, as shown therein, the riveted circuit breaker C2 is advanced to the outlet end of the guideway 148, and the riveted circuit breaker C1 is advanced into the removal chute 250, said latter circuit breaker operating the plunger 296 (Fig. 2) for rotating the lever 300 to close the normally open micro switch 292, as previously explained. This initiates the operating cycle of the entire apparatus and, in particular, immediately activates orienting apparatus 20, which therefore, operates in response to the movement of an article into the riveting station. This operation of plunger 296 completes a circuit through a solenoid 370 (Fig. 10) for energizing the latter. This circuit may be traced, as follows; from the power input 372 through the closed start switch 374, through the lead 376, through the closed switch 310, through the lead 378, through the closed switch 292, through the lead 380, to the solenoid 370, and through the latter to the lead 382 which extends through the start switch 374 to the other power input terminal 384. With the solenoid 370 energized, the contacts 370A and 370B thereof, which are normally biased to open condition, are closed to complete a holding circuit for the solenoid 370 which can be traced as follows; from the power input terminal 384, through the switch 374, through the lead 382, through the solenoid 370, through the lead 385, through the engaged contacts 370A and 370B, through the lead 386, through the normally closed contacts 330A—330B of micro switch 330, and through the leads 388 and 376 to the other power terminal 372. In addition to completing its own holding circuit, the solenoid 370 also completes a circuit through the solenoid 204 to energize the latter. More specifically, upon the energization of the solenoid 370, the normally open contacts 370C and 370D thereof are also closed so that the circuit for energizing the solenoid 204 may be traced as follows; from the power input terminal 384, through the closed start switch 374, through the lead 390, through the solenoid 204, through the lead 392, through the engaged contacts 370C and 370D, and through the lead 386, the normally closed contacts 330A and 330B of switch 330, the leads 388 and 376 to the other power terminal 372.

As previously described, the energization of the solenoid 204 results in the pivotal movement of the bell crank lever 198, from the broken line position thereof illustrated in Fig. 3, to the full line position thereof, for moving the companion fingers 162 and 164 into the guideway. If the circuit breaker, which is in position at the riveting station, is properly disposed, and oriented thereby, the fingers will move to the maximum inward position thereof, as illustrated in Fig. 1, engaging opposite corners of the circuit breaker casing. However, if for any reason, the circuit breaker casing is in such a position wherein it cannot be properly oriented at the riveting station, it will be apparent that the fingers will be prevented from completing the full inward stroke thereof, by engaging portions of the circuit breaker different from the two corners thereof, which are engaged as illustrated in Fig. 1. Consequently, this will prevent the completion of the pivotal movement of the bell crank lever 198 to its full line position illustrated in Fig. 3, in which full line position the switch 220 is closed by the lever arm 202 as previously indicated. Therefore if the switch 220 does not close, the circuit for operating the previously described air motor 96 is not completed and the table will not move, so that the riveting machine will not operate. This will be an indication to the operator that the circuit breaker in position at the riveting station is not properly disposed and the necessary adjustment can be made. Consequently, it will be apparent that unless the fingers 162 and 164 move through their full inward stroke into the guideway, the article to the riveted is not correctly disposed or oriented for the riveting operation and the machine will not operate, thereby to prevent damaging such an article. However, with the article properly disposed thereby, as illustrated in Figs. 1 and 4, the fingers complete their full stroke from the position thereof illustrated in Fig. 4 to the position thereof illustrated in Fig. 1, and this permits the normally open micro switch 220 to be closed by the bell crank lever 198.

With the switch 220 closed by the bell crank lever 198, a circuit is completed through the transformer 100 in the air motor which is operable, as previously described, to evacuate the air motor or reduce the pressure therein, to permit the table to descend from its upper position to its lower position. Said circuit may be traced as follows; from the power input terminal 384, through the closed switch 374, through the line 390 through the primary of transformer 100, through the lead 394, through the closed switch 220, through the lead 378, through the normally closed switch 310, and through the lead 376 to the other power terminal 372. This evacuates the air from the air cylinder or motor 96, and the carriage 42 drops by its own weight, and assisted by the springs 58 as previously described. As the carriage moves down, the third article locating finger 166 moves inwardly to engage the circuit breaker and assure the correct disposition thereof, as illustrated in Fig. 1, due to the roller 238 riding down the cam surface 236 of the cam 232 (Figs. 1 and 8), as previously described, so that it will be readily understood that the article, which is here shown as a circuit breaker, is firmly retained and oriented in the riveting position by the three locating or positioning fingers, and by the leaf spring 360.

The article is now properly disposed so that the anvil members 124 engage in the recesses 118B in the article, as illustrated in Fig. 6, when the carriage 42 moves down to its lowermost position. It will be apparent that when the carriage moves down, the switch 310 (Figs. 2 and 3) is opened, since the operating part 320 mounted on the yoke 46 of the carriage 42 moves away and out of engagement with the switch operating element 318. However, it will be apparent that the solenoid 370 remains energized through its holding circuit, completed by its engaged contacts 370A and 370B whereby to retain the solenoid 204 which operates the fingers 162 and 164, in its energized condition. When the carriage reaches its lowermost position, as illustrated in Fig. 6, the switch operating part 326 engages the switch operating element 324 of the normally open micro switch 312 to close the latter. The closing of switch 312 results in the energization of the foot-pedal solenoid 344 and the circuit therefor may be traced as follows; from the power terminal 384 through the closed start switch 374, through the lead 400, through the solenoid 344, through the lead 402, through the closed switch 312, through the lead 404, through the lead 380, through the lead 385, through the engaged contacts 370A and 370B, through the lead 386, through the closed contacts of switch 330 and through leads 388 and 376 to the other power terminal 372. Upon energization of the solenoid 344, the latter is effective to operate the foot pedal 345 of the automatic riveting machine, as previously described, for initiating the riveting cycle thereof, the pedal having theretofore been actuated by the attendant. The operating linkage is diagrammatically illustrated at 347 in Figure 10. This linkage initiates the operation of the operating mechanism for the automatic riveting machine, diagrammatically indicated at 349. As previously stated since the automatic riveting machine and the operating mechanism thereof are well known in the art and are in commercial use, detailed illustration and description thereof is deemed to be unnecessary herein.

Upon initiation of its cycle of operation, the automatic riveting machine is effective to deposit a rivet 120, in its usual well known manner, into each of the apertures 118A of the circuit breaker casing, and said rivets will be in registry with the locating finger portions 146 of the anvil members 124. The riveting head 340 now descends in its usual and well known manner, so that each of its riveting hammers 122 engages in the recess 118A in the casing, as illustrated in Fig. 6, to urge the rivets against the shoulders 144 of the anvil member 124 to upset the rivets for riveting the casing parts together. As previously indicated, the anvil members 126 are permitted to yield under the pressure of the riveting hammers through the contraction of the springs 134, to as to prevent any damage to the casing which is being riveted. At the bottom of its punch stroke, the riveting head 340 carries the operating part 336, mounted thereon (Fig. 2), into engagement with the operating element 334 of the switch 330, to open the latter at its normally closed contacts 330A and 330B, and to close the latter at its normally open contacts 330C and 330D. The closing of the contacts at 330C and 330D results in the energization of the primary of the transformer 102 for raising the carriage. The energizing circuit for the primary of transformer 102 may be traced as follows; from the power input terminal 372, through the lead 388, through the closed contacts 330C and 330D, through the lead 406, through the primary of transformer 102, and through the lead 382 to the other power input terminal 384. Air pressure is now built up in the air motor 96, the plunger 94 thereof operates to move the link 90 in the direction of the arrow 104 to pivot the rocker arm from the broken line to the full line position thereof illustrated in Fig. 3, for raising the carriage, whereby to withdraw the riveted circuit breaker C2 upwardly away from the anvils. In this connection, it will be understood that the operating mechanism for the automatic riveting machine had operated through its cycle to withdraw the riveting head 340 to the position thereof illustrated in Fig. 2 at the completion of its riveting operation. As previously indicated, upon movement of the carriage 42 downwardly to its riveting position, the removal chute 250 operated to the position thereof illustrated in Fig. 6 to discharge the riveted circuit breaker contained therein, so that when the carriage now returns to its uppermost position, the expanded spring 280 contracts as the rollers ride up the cam surface 276, to return the removal chute to its normal position illustrated in Fig. 2, so that the mechanism is now in condition for initiating the next cycle of operation. This is initiated by the operator as he manually moves the row of circuit breakers in the direction of the arrows 360, to advance the circuit breaker which had just been riveted, from the riveting station to the position of the circuit breaker C1 in Fig. 6, and to advance the circuit breaker which had been in the position of C1 in Fig. 6, into the removal chute 250 so that the circuit breaker in position of C3 (Fig. 6) may be advanced into the riveting station R simultaneously with the closing of the switch 292 by the circuit breaker in the removal chute to initiate the cycle of operation.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. In an automatic riveting machine having riveting tool means, anvil means, and mechanism for relatively moving said means to effect a riveting operation on a rivet disposed in the rivet recess of an article to be riveted; that improvement which comprises automatic locating mechanism operable upon the article to be riveted to automatically effect the registry of the rivet recess therein with said anvil and tool means, and means responsive to the operation of said locating mechanism for initiating the operation of said moving mechanism to effect said riveting operation, said initiating means including normally unenergized circuit means for effecting the operation of said moving means, and means for energizing said circuit means in response to the operation of said locating mechanism to effect said registry of the rivet recess with said anvil and tool means, said energizing means comprising an article support, means for relatively moving said support and said anvil means to engage said anvil means and the rivet recess, means operable in response to said relative movement of said support and said anvil means to energize said circuit means, and means for operating said moving means in response to the operation of said locating mechanism to effect said registry of the rivet recess with said anvil and tool means.

2. An automatic riveting machine as defined in claim 1, further characterized in that said article support is mounted for movement relative to said anvil means.

3. An automatic riveting machine as defined in claim 1, further characterized in that said relative moving means includes motive means for moving said article support toward and away from said anvil means in timed relation with said riveting operation, whereby to engage said anvil means and the rivet recess prior to said operation and to effect disengagement thereof after the riveting operation.

4. Apparatus for positioning an article at a riveting station to effect registry of a rivet-receiving portion thereof with a riveting tool and a riveting anvil, said apparatus comprising means for supporting the article at said riveting station, and means operable at said station upon the article to orient the latter to register said portion thereof with said tool and anvil, said support being a guideway for directing said article to said station, and means operable in response to the disposition of said article at said station for operating said orienting means, and means mounting said guideway for movement relative to said anvil to effect engagement of the latter and said article portion for the riveting operation, and means for effecting movement of said guideway under the control of said orienting means, whereby to move said guideway after said article portion is in registry with said tool and anvil.

5. In a riveting machine having a riveting tool and an anvil, a guideway for articles extending between said riveting tool and anvil, said guideway being mounted for movement relative to said tool and anvil to dispose an article for the riveting thereof, said guideway having provision to support the articles in a row thereof and having a station at which the article to be riveted is supported, article removing means at one end of said guideway for receiving a riveted article upon movement of the row of articles to dispose an unriveted article at said station, and means for operating said article removing means to effect discharge of an article therefrom under control of and in response to said movement of said guideway.

6. In a riveting machine having a riveting tool and an anvil, a guideway for articles extending between said riveting tool and anvil, said guideway being mounted for movement relative to said tool and anvil to dispose an article for the riveting thereof, said guideway having provision to support the articles in a row thereof and having a station at which the article to be riveted is supported, article removing means at one end of said guideway for receiving a riveted article upon movement of the row of articles to dispose an unriveted article at said station, and means for operating said article removing means to effect discharge of an article therefrom under control of and in response to said movement of said guideway, said article removing means including an article supporting plate normally in line with said guideway and pivotally mounted for movement to a position sloping downward and away from said guideway, and means for effecting pivotal movement of said plate upon said movement of said guideway, whereby to discharge the article on said plate therefrom.

7. In a riveting machine having a riveting tool and an anvil, an article guideway extending between said riveting tool and anvil, said guideway having a riveting station, means mounting said guideway for movement relative to said anvil for engaging the latter and the rivet portion of an article at said station, article orienting means operable in said guideway to effect registry of said rivet portion with said anvil and tool, and means responsive to the movement of an article into said riveting station for operating said orienting means and for effecting movement of said guideway in timed relation to the operation of said orienting means, whereby to effect said registry of said rivet portions prior to said engagement thereof with said anvil.

8. In a riveting machine having a riveting tool and an anvil, an article guideway extending between said riveting tool and anvil, said guideway having a riveting station, means mounting said guideway for movement relative to said anvil for engaging the latter and the rivet portion of an article at said station, article orienting means operable in said guideway to effect registry of said rivet portion with said anvil and tool, article receiving and removing means at one end of said guideway for receiving a riveted article upon movement of an unriveted article into said station, and means responsive to the movement of an article to said article receiving and removing means for operating said orienting means and for effecting movement of said guideway in timed relation to said orienting means, whereby to effect said registry of said rivet portion prior to said engagement thereof with said anvil.

9. In a riveting machine having a riveting tool and an anvil, an article guideway extending between said riveting tool and anvil, said guideway having a riveting station, means mounting said guideway for movement relative to said anvil for engaging the latter and the rivet portion of an article at said station, article orienting means operable in said guideway to effect registry of said rivet portion with said anvil and tool, and means responsive to the movement of an article into said riveting station for operating said orienting means and for effecting movement of said guideway in timed relation to said orienting means, whereby to effect said registry of said rivet portion prior to said engagement thereof with said anvil, and means for operating said movement effecting means under the control of said orienting means whereby to prevent said movement of the guideway if said rivet portion is not in registry with said tool and anvil.

10. In a riveting machine having a riveting tool and an anvil, an article guideway extending between said riveting tool and anvil, said guideway having a riveting station, means mounting said guideway for movement relative to said anvil for engaging the latter and the rivet portion of an article at said station, article orienting means operable in said guideway to effect registry of said rivet portion with said anvil and tool, and means responsive to the movement of an article into said riveting station for operating said orienting means and for effecting movement of said guideway in timed relation to said orienting means, whereby to effect said registry of said rivet portion prior to said engagement thereof with said anvil, said orienting means including opposing elements mounted for reciprocation in said guideway, one of said elements being operable by said operating means for said orienting means and the other of said elements being operable in response to said movement of said guideway.

11. A riveting machine as defined in claim 16, further characterized in that said responsive means includes switch means operable upon movement of an article into said station to energize said orienting means, motive means, switch means operable in response to the operation of said orienting means to energize said motive means to effect movement of said guideway to said anvil, means for operating said tool through a riveting stroke thereof in response to said latter movement of said guideway, and means for operating said motive means in response to said riveting stroke to move said guideway away from said anvil.

12. Apparatus for positioning an article accurately at a work station and for removal of an article previously disposed therein, including a guideway along which a series of articles may be pushed to the work station and therebeyond to a removal station, means at the removal station to arrest the series of articles and thereby to arrest one of the articles at the work station, and means including at least one orienting element movable transversely of the guideway and effective to prevent pressure being transmitted to any article beyond the work station despite application of pressure along the guideway applied to articles approaching and in the work station.

13. In a riveting machine having a riveting tool and an anvil, an article guideway extending between said riveting tool and anvil, said guideway having a riveting station, means mounting said guideway for movement relative to said anvil for engaging the latter and the rivet portion of an article at said station, article orienting means operable in said guideway to effect registry of said rivet portion with said anvil and tool, actuating means causing said movement of said guideway relative to said anvil, and means responsive to said relative movement for actuating said riveting tool.

References Cited in the file of this patent

UNITED STATES PATENTS

| | | |
|---|---|---|
| 1,288,402 | Gale | Dec. 17, 1918 |
| 1,690,503 | Rhodes | Nov. 6, 1928 |
| 2,291,631 | Jorgensen | Aug. 4, 1942 |
| 2,310,008 | Wolff et al. | Feb. 2, 1943 |
| 2,357,888 | Gookin | Sept. 12, 1944 |
| 2,371,358 | Sekella | Mar. 13, 1945 |
| 2,392,169 | Mansfield | Jan. 1, 1946 |
| 2,502,227 | Makenny | Mar. 28, 1950 |
| 2,607,421 | Anderson | Aug. 19, 1952 |
| 2,684,719 | Johnson | July 27, 1954 |
| 2,722,274 | Turnbull | Nov. 1, 1955 |